US008427692B2

(12) United States Patent
Haga

(10) Patent No.: US 8,427,692 B2
(45) Date of Patent: Apr. 23, 2013

(54) IMAGE PROCESSING APPARATUSES AND SYSTEMS FOR RESPONDING TO WRITING ERRORS ASSOCIATED WITH HARD DISK DEVICES

(75) Inventor: Tatsuyoshi Haga, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1038 days.

(21) Appl. No.: 12/426,626

(22) Filed: Apr. 20, 2009

(65) Prior Publication Data
US 2009/0268333 A1 Oct. 29, 2009

(30) Foreign Application Priority Data

Apr. 23, 2008 (JP) ................. 2008-113234

(51) Int. Cl.
*G06F 3/12* (2006.01)
*G06K 15/00* (2006.01)
*G01R 33/12* (2006.01)
(52) U.S. Cl.
USPC .......................... 358/1.16; 358/1.14; 324/212
(58) Field of Classification Search .............. 358/1.14, 358/1.15, 1.16; 324/212
See application file for complete search history.

(56) References Cited

U.S. PATENT DOCUMENTS

| 2006/0055971 | A1* | 3/2006 | Fukuhara | 358/1.16 |
| 2007/0035769 | A1* | 2/2007 | Takato | 358/1.16 |
| 2008/0068656 | A1* | 3/2008 | Sato | 358/1.16 |

FOREIGN PATENT DOCUMENTS

| JP | 10-240907 | | 9/1998 |
| JP | 2000-138787 | | 5/2000 |
| JP | 2001-312375 | | 11/2001 |
| JP | 2004253035 | A * | 9/2004 |
| JP | 2006-142694 | | 6/2006 |
| JP | 2006-351059 | | 12/2006 |

OTHER PUBLICATIONS

Pinheiro, Eduardo, et al.; "Failure Trends in a Large Disk Drive Population"; Feb. 2007; Proceedings of the 5th USENIX Conference on File and Storage Technologies (FAST '07).*
Japanese Office Action dated Dec. 15, 2011, corresponding to Patent Application No. 2008-113234.

* cited by examiner

*Primary Examiner* — Twyler Haskins
*Assistant Examiner* — Fred Guillermety
(74) *Attorney, Agent, or Firm* — Finnegan, Henderson, Farabow, Garrett & Dunner, L.L.P.

(57) ABSTRACT

A self-diagnosis function is used to acquire information showing the state of deterioration of a hard disk device, and when the hard disk device is deteriorated, a job is executed under the control which is different from that in the case where the hard disk device is not deteriorated. For example, copying job is executed in the HDD use mode in the case of non-deterioration, and copying job is executed in the HDD non-use mode (an image memory is used) in the case of deterioration. Further, the number of retrials by an alternative sector in the case of occurrence of errors of writing in a hard disk device in the course of job execution is changed according to the state of the deterioration.

7 Claims, 7 Drawing Sheets

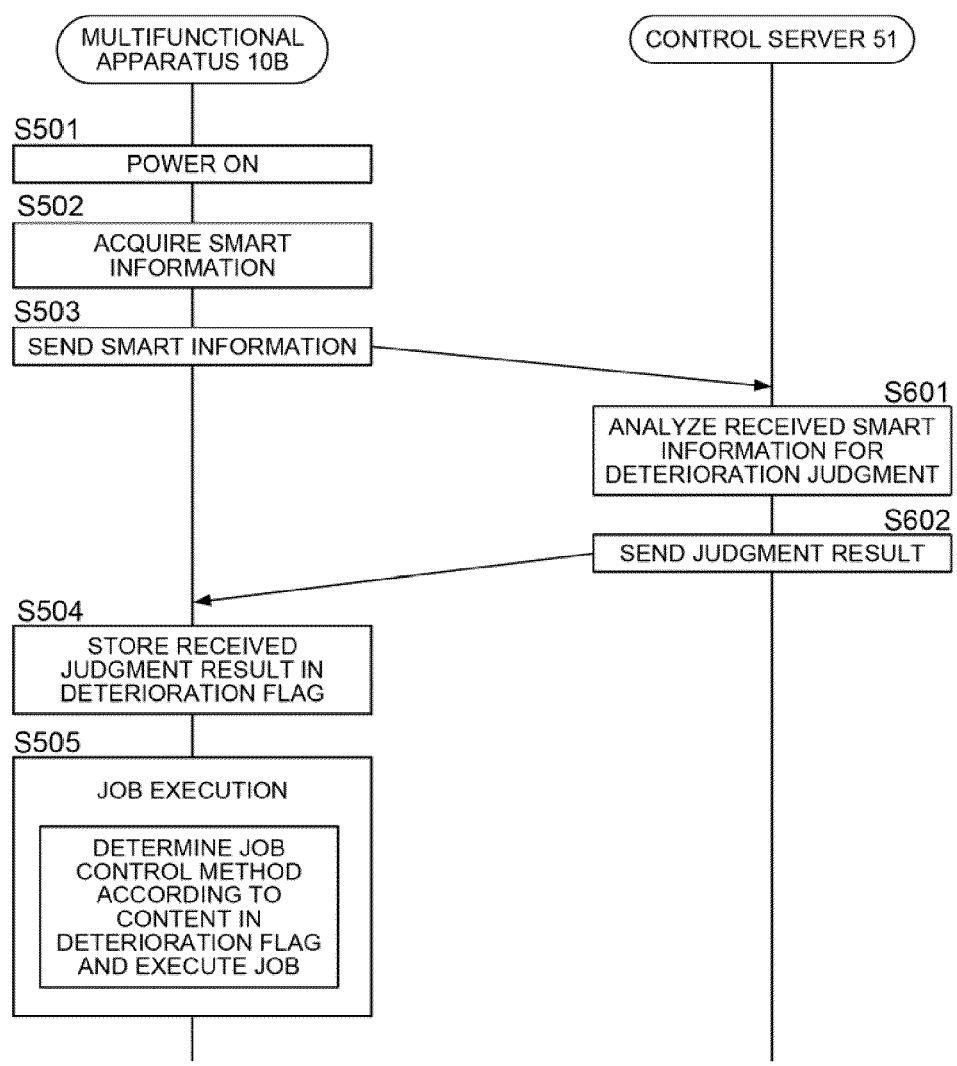

IMAGE PROCESSING APPARATUSES AND SYSTEMS FOR RESPONDING TO WRITING ERRORS ASSOCIATED WITH HARD DISK DEVICES

This application is based on Japanese Patent Application No. 2008-113234 filed on Apr. 23, 2008 in Japanese Patent Office, the entire content of which is hereby incorporated by reference.

BACKGROUND OF THE INVENTION

The present invention relates to an image processing apparatus equipped with a hard disk device in which image data are stored, an image processing system and an image processing method thereof.

Some of hard disk devices each representing a storage device with a large capacity are equipped with a self-diagnosis function (SMART; Self-Monitoring Analysis and Reporting Technology), and thereby, it is possible for a high-level device to acquire an internal temperature, a rate of occurrence of reading/writing errors, the number of defective sectors replaced by alternative sectors and information of the number of errors detected by ECC (error correction code).

In the case of digital multifunctional apparatuses equipped with copy functions and printer function for a document, many of them use hard disk devices for preservation of image data and for temporary storage, and thereby, operations of the apparatus are influenced greatly by troubles of the hard disk device.

Therefore, there has been proposed a system wherein failure of a hard disk device is predicted by utilizing the aforesaid self-diagnosis function, and when the occurrence of failure is predicted, the execution of the specific job is prohibited by limiting the function of the apparatus, so that serious situation such as loss of important data may not be brought about (for example, see Unexamined Japanese Patent Application Publication No. 2006-173743).

In the aforesaid system, if failure of the hard disk device is predicted a user suffers inconvenience terribly even when no troubles are caused actually, because the job relating to the limited functions cannot be executed.

SUMMARY

The invention is to solve the aforesaid problems, and its objective is to provide an image processing apparatus and an image processing system wherein a job can be executed in accordance with the state of deterioration even when deterioration of the hard disk device exists.

The main points of the invention for attaining the aforesaid objectives exist in respective items of the embodiment of the invention.

[A] An image processing apparatus including, a hard disk device which conducts reading or writing of image data during execution of a job which uses the image data, an acquisition section which acquires information indicating a state of deterioration of the hard disk device, and a control section which executes the job under a control when the hard disk device is judged to be deteriorated more than a predetermined standard based on the information acquired by the acquisition section, the control being different from a control employed when the hard disk device is judged not to be deteriorated more than the standard.

[B] An image processing method for an image processing apparatus which conducts reading or writing of image data on a hard disk device during execution of a job which uses the image data, the image processing method including the steps of, acquiring information indicating a state of deterioration of the hard disk device, and executing the job under a control when the hard disk device is judged to be deteriorated more than a predetermined standard based on the acquired information, the control being different from a control employed when the hard disk device is judged not to be deteriorated more than the standard.

In the embodiment of the invention, information showing the state of deterioration of the hard disk device is acquired by a self-diagnosis function or the like, and when the hard disk device is deteriorated but has not reached a breakdown, the job is executed under the control which is different from that in the case of no deterioration. In other words, the execution of the job is secured by changing contents of control in accordance with the state of deterioration. For example, in the case of the existence of deterioration, the job is executed without using the hard disk device, or by reducing a frequency of usage of the hard disk device.

[C] An image processing system including an image processing apparatus and a control server which are connected to be capable of communicating with each other, wherein the image processing apparatus includes, a hard disk device which conducts reading or writing of image data during execution of a job which uses the image data, an acquisition section which acquires information indicating a state of deterioration of the hard disk device, and a control section which transmits the information acquired by the acquisition section to the control server, and which receives from the control server a result of judgment showing whether the hard disk device is deteriorated more than a predetermined standard or not, and then which executes the job under a control when the result of judgment shows existence of the deterioration more than the standard, the control being different from a control employed when the result of judgment shows no existence of the deterioration more than the standard, wherein the control server receives the information from the image processing apparatus, and then, judges whether the hard disk device is deteriorated more than the predetermined standard or not based on the information, and transmits the result of judgment to the image processing apparatus.

In the aforesaid embodiment of the invention, the image processing apparatus transmits information showing the state of deterioration of the hard disk device to the control server, and then, the control server judges the deterioration based on the aforesaid information and sends a reply of the result of the judgment to the image processing apparatus. The image processing apparatus executes the job under the control corresponding to the result of the judgment received from the control server. By changing contents of the control corresponding to the state of deterioration of the hard disk device as stated above, the execution of the job can be secured. For example, in the case of existence of the deterioration, the job is executed by using no hard disk device or by reducing a frequency of usage of the hard disk device.

BRIEF DESCRIPTION OF THE DRAWINGS

FIG. 7 is an illustration showing an operation sequence of an image processing system.

DETAILED DESCRIPTION OF THE PREFERRED EMBODIMENTS

Figure 1:
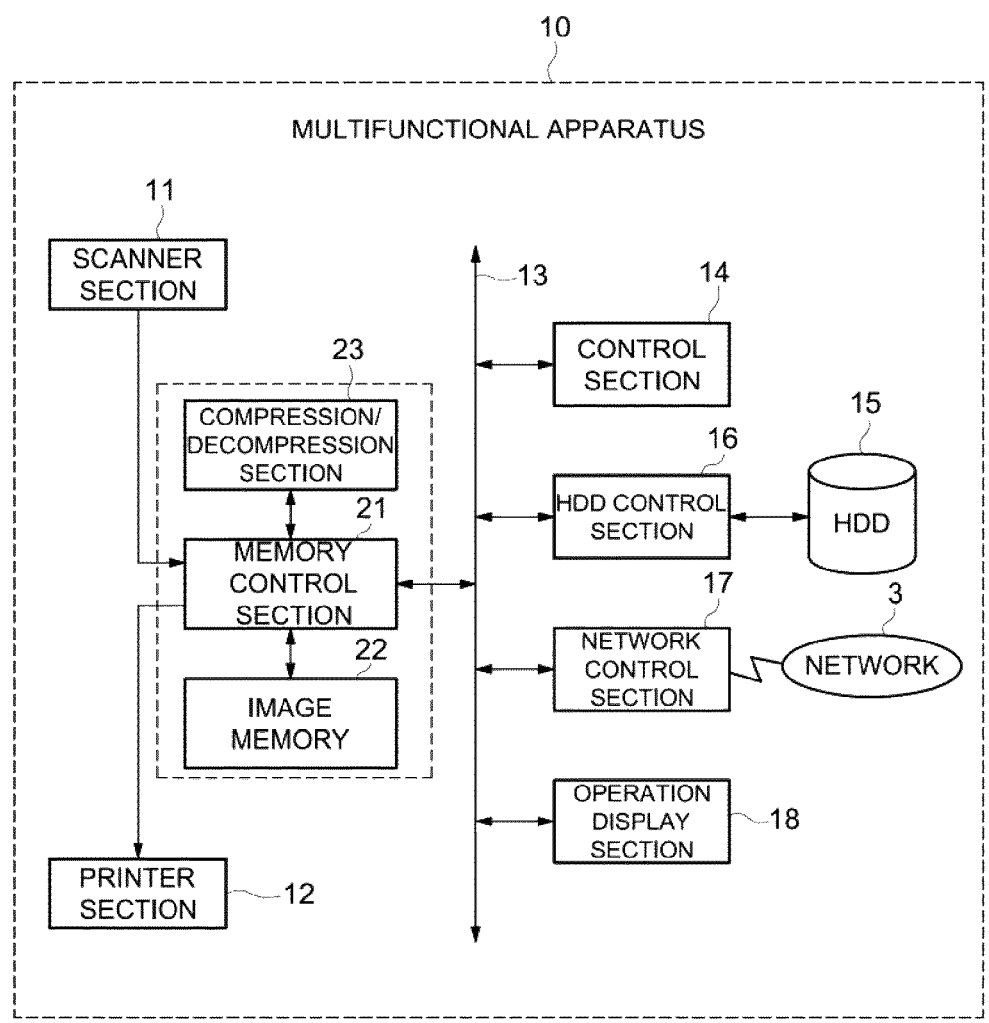
FIG. 1 is a block diagram showing a schematic structure of a multifunctional apparatus representing an image processing apparatus relating to an embodiment of the invention.

Further embodiments based on the abovementioned embodiments are described as follows.

[1] The image processing apparatus of Item [A] further including,
a semiconductor memory which stores image data,
wherein the control section uses the semiconductor memory and the hard disk device for temporary storage of the image data to execute the job when the hard disk device is judged not to be deteriorated more than the standard, and
wherein the control section uses the semiconductor memory for temporary storage of the image data to execute the job without using the hard disk device when the hard disk device is judged to be deteriorated more than the standard.

[2] The image processing method of Item [B],
wherein the image processing apparatus further includes,
a semiconductor memory which stores image data,
wherein the step of executing the job includes,
using the semiconductor memory and the hard disk device for temporary storage of the image data to execute the job when the hard disk device is judged not to be deteriorated more than the standard, and
using the semiconductor memory for temporary storage of the image data to execute the job without using the hard disk device when the hard disk device is judged to be deteriorated more than the standard.

[3] The image processing system of Item [C],
wherein the image processing apparatus further includes,
a semiconductor memory which stores image data,
wherein the control section uses the semiconductor memory and the hard disk device for temporary storage of the image data to execute the job when the result of judgment shows that the hard disk device is not deteriorated more than the standard, and
wherein the control section uses the semiconductor memory for temporary storage of the image data to execute the job without using the hard disk device when the result of judgment shows that the hard disk device is deteriorated more than the standard.

In the aforesaid embodiment of the invention, when the hard disk device is not deteriorated, a semiconductor memory and a hard disk device are used for temporary storage of image data to execute the job, and when the hard disk device is judged to be deteriorated, the semiconductor memory is used for temporary storage of image data to execute the job, without using the hard disk device.

[4] The image processing apparatus of Item [A],
wherein the control section differentiates controls relating to retrial treatment for an error of writing on the hard disk device between when the hard disk device is judged to be deteriorated more than the standard and when the hard disk device is judged not to be deteriorated more than the standard.

[5] The image processing system of Item [C],
wherein the control section differentiates controls relating to retrial treatment for an error of writing on the hard disk device between when the result of judgment shows that the hard disk device is deteriorated more than the standard and when the result of judgment shows that the hard disk device is not deteriorated more than the standard.

In the aforesaid embodiment of the invention, with respect to the hard disk device, when it is deteriorated, writing errors tend to be caused, and a possibility for writing errors to occur again even when retrial is conducted is enhanced. Therefore, when the hard disk device is judged to be deteriorated, a control that hardly causes a job suspension is carried out by increasing the number of retrials conducted until the job suspension, compared with an occasion of no deterioration.

[6] The image processing apparatus of any one of Items [A], [1] and [4],
wherein the acquisition section further acquires information showing an environmental condition of the hard disk device, and the control section changes the control in accordance with the acquired environmental condition.

In the embodiment of the invention mentioned above, information showing environmental conditions such as temperatures and vibrations is acquired, and control relating to the job execution is changed depending on the acquired information. For example, when a temperature is higher or lower than an appropriate temperature range, the control is carried out to reduce the number of sheets for reading or printing per unit time because an access speed of the hard disk device is sometimes lowered, or the control is carried out to discontinue the access to the hard disk device during the execution of the job while a vibration is being detected.

[7] The image processing apparatus of any one of Items [A], [1], [4] and [6], which acquires the information by a self-diagnosis function of the hard disk device.

[8] The image processing system of any one of Items [C], [3] and [1], which acquires the information by a self-diagnosis function of the hard disk device.

An embodiment of the invention will be described as follows, referring to the drawings.

FIG. 1 shows a schematic structure of multifunctional apparatus 10 representing an image processing apparatus relating to the embodiment of the invention. The multifunctional apparatus 10 is equipped with a function to conduct copying operations by reading an original document and by forming its duplication images on a recording sheet to output them, and a preservation function to preserve image data obtained by reading an original document, and an output function to print based on preserved image data, and further a printer function to rasterize printing data received from external terminals to print.

The multifunctional apparatus 10 is equipped with scanner section 11 that reads original documents and with printer section 12 that forms images on a recording sheet according to the image data. The scanner section 11 is equipped with a light source that illuminates the original document, a line image sensor that reads an original document in the width direction by an amount equivalent to one line, and a moving mechanism that moves a reading position of one line in the longitudinal direction of the original document, and an optical part composed of lenses and mirrors that guide reflected light coming from the original document to the line image sensor and further an A/D converter that converts analog image signals outputted from the line image sensor into digital image data. Furthermore, the scanner section 11 is equipped with an unillustrated automatic document feeding device for reading plural sheets of original document continuously.

The printer section 12 has therein a conveyance device for recording sheets, a photoconductor drum, a charging unit, a laser unit, a developing unit, a transfer separation unit, a cleaning unit and a fixing unit, and it is constituted as a printer engine of a laser type that forms images on a recording sheet through electrophotographic process.

Further, the multifunctional apparatus 10 is equipped with control section 14 that collectively controls operations of the multifunctional apparatus 10, and HDD control section 16 that controls data-reading and data-transfer for hard disk device 15 representing a large-capacity nonvolatile memory, and network control section 17 for communicating with external terminals through a network, and operation display section 18 and further memory control section 21, which are all connected to system bus 13.

The control section 14 includes a CPU (Central Processing Unit), a flash memory that stores programs executed by the CPU and a RAM (Random Access Memory) that is used as a work memory when programs are executed by the CPU as main parts. A magnetic disk apparatus is used for the hard disk device 15. This may also be a hard disk device of another type such as a magneto optical disk. The hard disk device 15 is equipped with a SMART (Self-Monitoring Analysis and Reporting Technology) function as a self-diagnosis function.

The operation display section 18 is composed of a liquid crystal display, a touch panel formed on the surface of the liquid crystal display and of other operation switches. On the liquid crystal display, there are displayed various types of operation screens, guide screens and warning screens. Further, various types of instructions are received from a user through the touch panel and the operation switch.

Image memory 22 that stores image data temporarily and compression/decompression section 23 that compresses and decompresses the image data are connected to the memory control section 21. For the image memory 22, a semiconductor memory capable of being accessed at high speed (for example, DIMM: (Dual In-line Memory Module) is used.

The memory control section 21 carries out a function to control the writing operation and reading operation of image data for the image memory 22 and input and output operations of data for compression/decompression section 23. Image data outputted by scanner section 11 are inputted in memory control section 21. Image data read out of image memory 22 are supplied to printer section 12 through the memory control section 21.

In operations of the multifunctional apparatus 10, there are an HDD use mode that uses hard disk device 15 and an HDD non-use mode that does not use hard disk device 15. For example, the copy job in the HDD use mode is conducted under the control wherein image data obtained by reading an original document with scanner section 11 are compressed successively by compression/decompression section 23 to be stored temporarily in image memory 22, and the compressed image data are transferred to hard disk device 15 to be preserved. At the same time, the preserved compressed image data are read from hard disk device 15 in accordance with output timing to image memory 22, thus, image data are outputted successively to printer section 12 through memory control section 21 after being decompressed by compression/decompression section 23.

With respect to preservation into and reading out of hard disk device 15 of compressed image data, control section 14 designates a sector directly without using a file system so that reading and writing may be conducted in each sector. Owing to this, compressed image data are arranged on sectors that are consecutive as far as possible, to prevent a decline of access speed caused by increase of seeking motion.

Copy job in the HDD non-use mode is conducted through the control wherein image data obtained by reading an original document with scanner section 11 are successively compressed by compression/decompression section 23 to be stored in image memory 22 temporarily, and then, compressed image data are decompressed by compression/decompression section 23 in accordance with output timing, to be outputted to printer section 12 through memory control section 21.

The multifunctional apparatus 10 is arranged to judge how the hard disk device 15 is deteriorated by utilizing a self-diagnosis function (SMART function) of the hard disk device 15, and thereby to execute the job under the control according to the state of deterioration. From now on, there will be described operations to change the control relating to the execution of the job based on the judgment of deterioration of the hard disk device 15 utilizing the SMART function.

Figure 2:
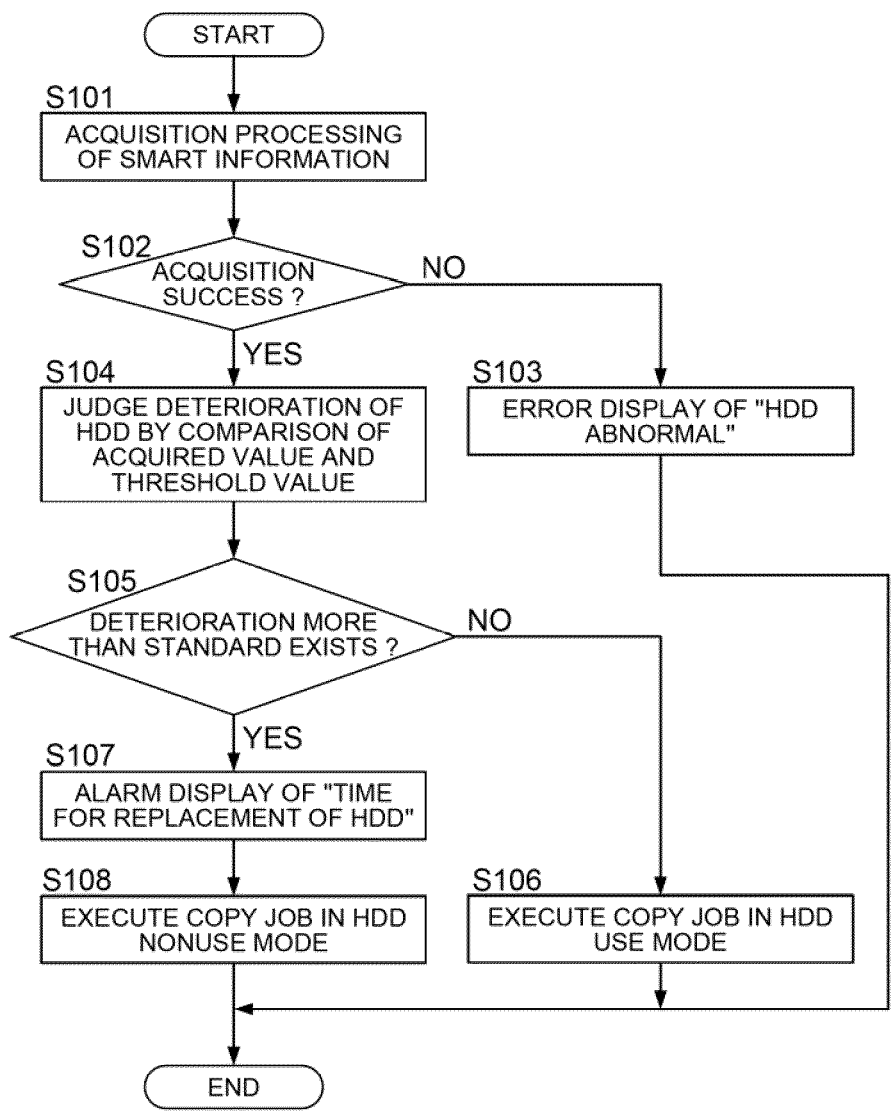
FIG. 2 is a flow diagram showing a flow of control for execution of a copying job based on judgment of the deterioration.

FIG. 2 shows a flow of control for execution of copying job based on judgment of deterioration. When the copying job is inputted, the control section 14 conducts acquisition processing of the SMART information (various information showing results of self-diagnoses) by using the SMART function (step S101), and when the acquisition of the SMART information is failed (step S102; No), the control section 14 causes the operation display section 18 to display an error message showing abnormality of the hard disk device 15 (step S103) because hard disk device has gone wrong, and the processing is terminated (end).

When the acquisition of the SMART information is successful (step S102; Yes), the hard disk device 15 is judged whether it is deteriorated more than the standard or not (step S104), by comparing each value acquired (acquisition value) with a threshold value determined in advance for the judgment of the deterioration. Incidentally, from now on, it is assumed that "deteriorated" means an occasion of the deterioration equal to or more than the standard, and "not deteriorated" means an occasion of the deterioration that is less than the standard. The "deteriorated" means an occasion where no breakdown has been reached at this moment, but a high possibility of a breakdown in the near future is judged.

In this case, values of various items including a rate of occurrence of reading errors (Raw Read Error Rate), the number of defective sectors reallocated (Reallocated Sectors Count), a seek error rate, internal temperatures, and the execution number of reallocations (Reallocation Event Count) are acquired by the SMART function, and acquisition values of respective items are compared with threshold values determined for the items in advance, to judge the state of deterioration.

For example, presence or absence of deterioration is judged by the methods including (1) a method to judge that deterioration more than the standard exists if even a single item exceeds a threshold value for that item, (2) a method to judge that deterioration more than the standard exists if a degree of deterioration is marked for each item and the total points exceeds the prescribed value, and a method to use the aforesaid methods (1) and (2) jointly. A method to judge deterioration by evaluating respective acquisition values is not limited to the aforesaid method, and an optional judging method can be employed. In this case, presence or absence of deterioration is judged by the method of aforesaid (1).

When the result of judgment for the deterioration judgment based on the SMART information shows "not deteriorated" (step S105; No), a copying job is executed under the aforesaid HDD use mode (step S106).

When the result of judgment for the deterioration judgment based on the SMART information shows "deteriorated" (step S105; Yes), a copying job is executed under the aforesaid HDD non-use mode (step S108) after displaying a caution message saying "the hard disk device needs to be replaced" on operation display section 18 (step S107). Under the HDD non-use mode, execution of job is secured although performance decline of multifunctional apparatus 10 is caused to a certain extent, thus, it is possible to reduce a loss and inconvenience which a user suffers, compared with an occasion where execution of the job is prohibited when a breakdown is predicted.

In the meantime, when deterioration of hard disk device is judged to be more than the standard based on the SMART information, it is also possible to prohibit execution of the job where use of the hard disk device 15 is indispensable such as a preserving function that preserves image data obtained by reading an original document, and to execute the job under the operation mode wherein hard disk device 15 is not used, for the job wherein use of hard disk device is not indispensable like a copying job.

Next, there will be described an occasion wherein the control for retrial processing is changed depending on the results of deterioration judgment based on the SMART information when an error for writing on a sector occurs.

In the multifunctional apparatus 10, when sector abnormality occurs during processing of writing on hard disk device 15 in the course of executing the job, a control to try writing on another sector by giving up using that area (which is called retrial) is conducted. In this case, retrial is repeated within the prescribed upper limit number of times, by taking the designated waiting time Tw such as 100 ms. If the writing of retrial within the upper limit number of times is successful, execution of the job is continued, while if the writing is not successful even when the retrial of upper limit number of times is conducted, execution of the job is discontinued.

In this case, it is controlled to change a retrial interval (waiting time) and upper limit number of retrials. In other words, in the case of the "deteriorated", occasions to discontinue jobs is reduced by increasing both or one of the upper limit number of retrials and a length of the waiting time, compared with the occasion of the "not deteriorated".

Figure 3:
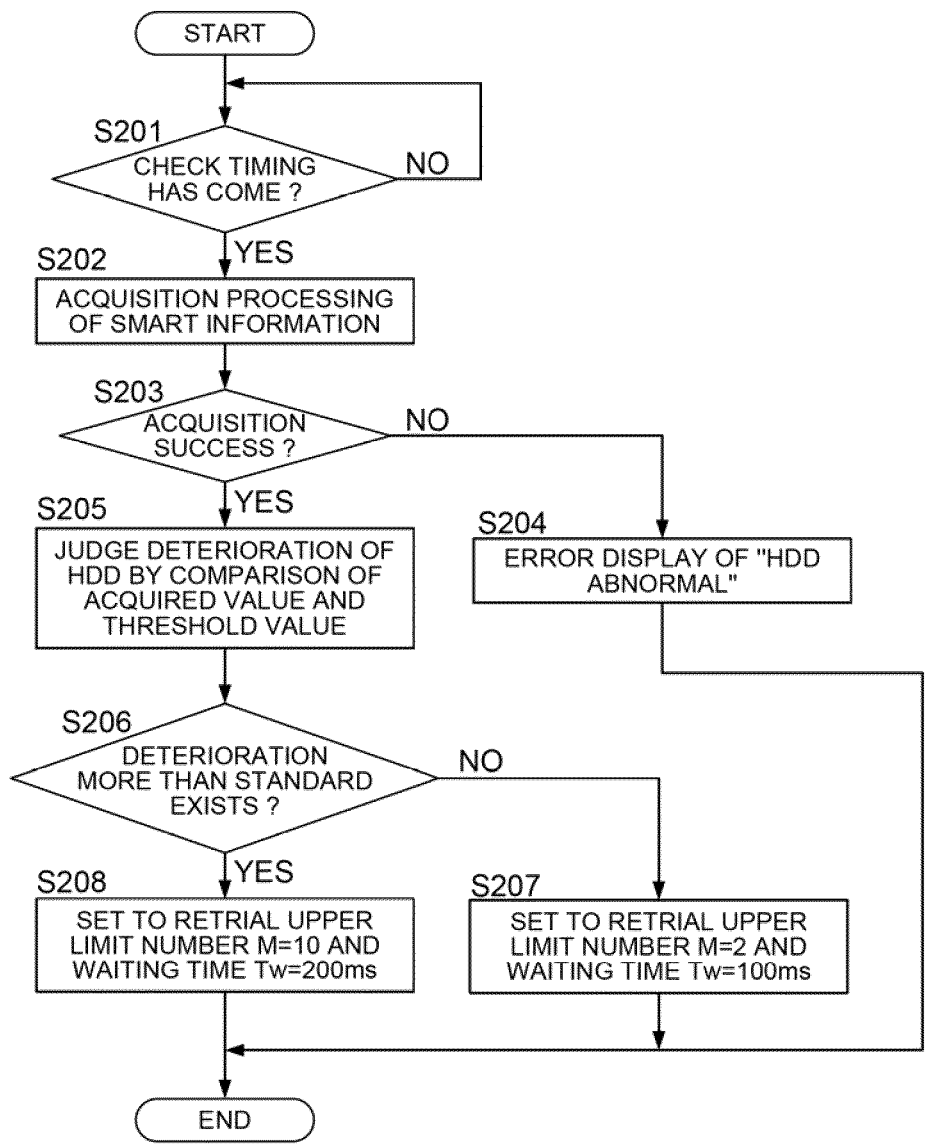
FIG. 3 is a flow diagram showing processing to establish a setting value of retrial processing based on the SMART information.
Figure 4:
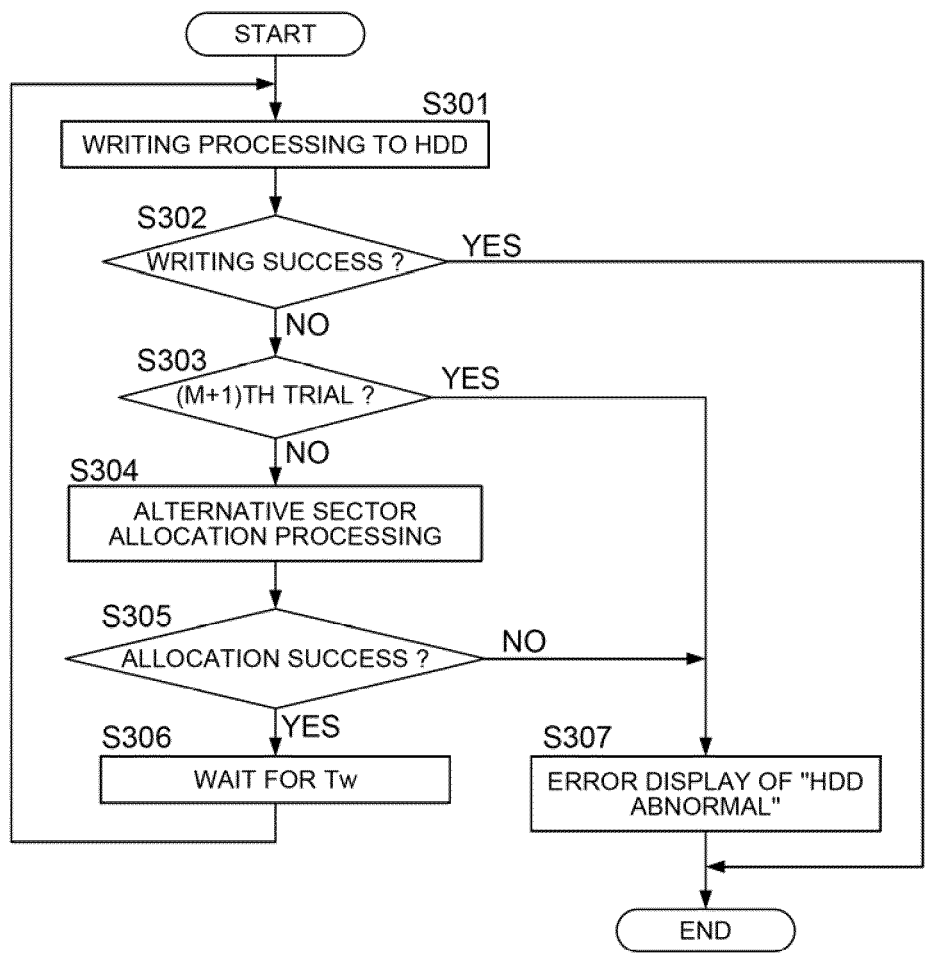
FIG. 4 is a flow diagram showing a flow of writing in a sector unit of the hard disk device conducted in the course of execution of the job.

Each of FIGS. 3 and 4 shows the aforesaid flow. The SMART information is read at the starting time of the job, or once a day (for example, in the initializing processing after power on) or once in several days, to judge the state of deterioration (presence or absence of deterioration) of hard disk device 15, then, a retrial interval (waiting time) and an upper limit number of retrials are established to be stored, and when writing errors are caused, retrial processing is conducted in accordance with the stored contents of establishment. When the aforesaid processing is conducted in the case other than the power-on occasion, established value of the number of retrials and waiting time are stored in a nonvolatile memory.

As shown in FIG. 3, when check timing determined in advance such as power-on time has come (step S201; Yes), control section 14 conducts acquisition processing for the SMART information (step S202), and when the control section 14 fails in acquisition of the SMART information (step S203; No), the control section 14 causes operation display section 18 to display error messages showing abnormality of the hard disk device 15 (step S204) to terminate the processing (end).

When the acquisition of the SMART information is successful (step S203; Yes), each value acquired (acquisition value) is compared with a threshold value determined in advance for judgment of the deterioration, to judge whether the hard disk device 15 is deteriorated more than the standard or not (step S205).

When the result of the judgment shows "not deteriorated" (step S206; No), retrial upper limit number M is set to two times and waiting time Tw is set to 100 ms (step S207) to terminate the processing (end). When the result of the judgment shows "deteriorated" (step S206; Yes), retrial upper limit number M is set to ten times and waiting time Tw is set to 200 ms (step S208) to terminate the processing (end).

FIG. 4 shows a flow of writing processing in a sector unit on the hard disk device 15 that is conducted in the course of execution of the job. The control section 14 conducts writing processing on a prescribed sector of the hard disk device 15 (step S301), and when the writing is successful (step S302; Yes), the writing processing for the sector is terminated (end). When the writing is failed (step S302; No), the retrial number is investigated whether or not the number exceeds the upper limit number M that is set in the processing in FIG. 3, and if it exceeds number M (in the case of (M+1)th try) (step S303; Yes), abnormality of the hard disk device 15 is displayed on the operation display section 18 (step S307) to terminate the processing (end).

When the retrial number is not in excess of number M (step S303; No), an alternative sector allocation processing is conducted (step S304). When the alternative sector allocation is failed because of circumstances that all alternative sectors have been used up (step S305; No), abnormality of the hard disk device 15 is displayed on the operation display section 18 (step S307) to terminate the processing (end).

When the alternative sector allocation is successful (step S305; Yes), the processing moves to step S301 after waiting for waiting time Tw established in processing shown in FIG. 3 (step S306), and writing (retrial) on the alternative sector is conducted.

Next, operations to recognize environmental conditions for hard disk device 15 with the SMART function, and thereby to change the control relating to the execution of the job in accordance with the environmental conditions, will be described referring to an example where vibration is detected.

Figure 5:
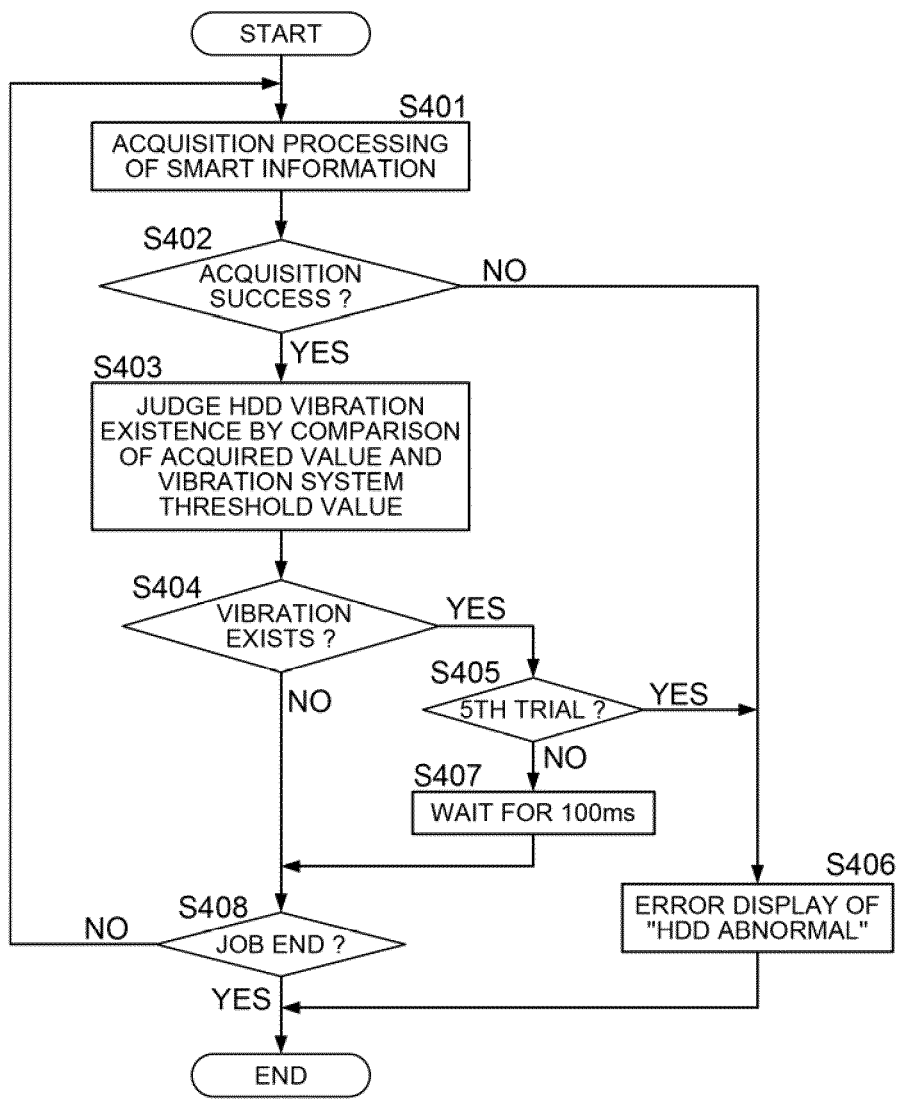
FIG. 5 is a flow diagram showing processing related to vibration detection in the course of job execution.

FIG. 5 shows a flow of processing relating to detection of vibration in the course of execution of the job. The control section 14 conducts this processing simultaneously while executing the job that requires an access to the hard disk device 15. The control section 14 conducts acquisition processing for the SMART information by using the SMART function (step S401), and when the control section 14 fails in acquisition of the SMART information (step S402; No), the control section 14 causes operation display section 18 to display error messages showing abnormality of the hard disk device 15 (step S406) to terminate the processing (end). In this case, the execution of the job is discontinued.

When the acquisition of the SMART information is successful (step S402; Yes), a acquired value of the SMART information showing the state of vibration of the hard disk device 15 (for example, Vibration During Write or the like) is compared with a threshold value determined in advance, and the hard disk device 15 is judged whether it is vibrated to exceed the standard amount or not by suffering from any impact or others (step S403).

When the hard disk device 15 is vibrated to exceed the standard amount (step S404; Yes), an access (at least writing access) is prohibited. Then, the vibration detection this time is judged whether it is 5th detection (predetermined upper limit number of times) in total or not (step S405), and if it is 5th detection (step S405; Yes) an error message showing abnormality of the hard disk device 15 is displayed on operation display section 18 (step S406), to terminate processing (end).

When the detection is less than the 5th detection (step S405; No), the processing moves to step S408 after waiting for 100 ms (step S407) for example, to observe changes in the state of vibrations.

When the hard disk device 15 is not vibrated (step S404; No), an access to the hard disk device 15 is allowed and the processing moves to step S408. In step S408, the job is judged whether it is terminated or not, and if the job is not terminated (step S408; No), the processing returns to step S401 to continue the processing, while, if the job is terminated (step S408; Yes), the processing is terminated (end).

As stated above, the state of vibration of the hard disk device 15 is monitored in real time by utilizing the SMART functions, and when the hard disk device 15 is vibrating, an access to the hard disk device 15 is prohibited until the vibration settles down, thus, destruction of sectors, reading errors and writing errors all caused by large vibrations can be prevented.

Next, an image processing system relating to the second embodiment will be described as follows.

Figure 6:
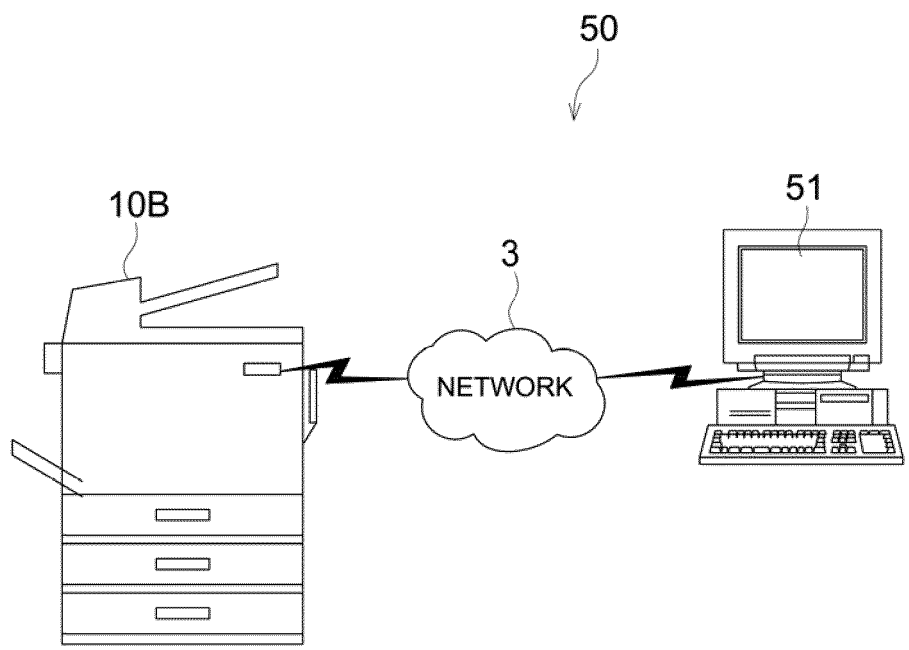
FIG. 6 is an illustration showing an example of system structure of an image processing system relating to the second embodiment of the invention.

FIG. 6 shows a system structure for image processing system 50 relating to the second embodiment. The image processing system 50 is composed of multifunctional apparatuses 10B and of control server 51 which are connected by network 3 to be capable of communicating. Plural multifunctional apparatuses 10B may also be provided.

Electrical and mechanical structures of the multifunctional apparatus 10B are the same as those of multifunctional apparatus 10 shown in FIG. 1, and description for them will be omitted accordingly. Control server 51 is composed of a computer apparatus equipped with a CPU, a ROM, a RAM, a network I/F section, a display section and an operation section, and various types of functions as control server 51 are realized when programs stored in the ROM are executed by the CPU.

In the image processing system 50, the multifunctional apparatuses 10B acquires the SMART information of the hard disk device 15 and transmits it to control server 51, and based on this information, the state of deterioration of the hard disk device 15 is judged by the control server 51, and results of the judgment are notified to the multifunctional apparatus 10B.

FIG. 7 shows an operation sequence of image processing system 50. When power-on time or check timing (once a day or once a few days) determined in advance has come (step S501), the control section 14 of the multifunctional apparatus 10B conducts acquisition processing for the SMART information by utilizing the SMART function of the hard device apparatus 15 housed in multifunctional apparatuses 10B (step S502), and transmits the SMART information thus acquired to control server 51 through network 3 by using network control section 17 (step S503).

The control server 51 that has received the SMART information from the multifunctional apparatuses 10B analyzes the SMART information thus received, then, judges the state of deterioration (presence or absence of deterioration that is equal to or more than the standard) of hard disk device 15 (step S601), and transmits results of the judgment to the multifunctional apparatuses 10B (step S602). Meanwhile, the SMART information used for judgment of the deterioration and a method of the judgment are the same as those of the multifunctional apparatus 10 in the first embodiment, and descriptions for them are omitted accordingly.

The multifunctional apparatuses 10B that has received the results of the judgment preserves the results in a deterioration flag (step S504). After that, the multifunctional apparatuses 10B refers to the deterioration flag when starting execution of the job, and when the deterioration flag shows "deteriorated", the multifunctional apparatuses 10B executes the job under the control used when hard disk device 15 is deteriorated, while, when the deterioration flag shows "not deteriorated", the multifunctional apparatuses 10B executes the job under the control used when the hard disk device 15 is not deteriorated (step S505).

For example, in the copying job, when the deterioration flag shows "not deteriorated", the job is executed under the HDD use mode, and when the deterioration flag shows "deteriorated", the job is executed under the HDD non-use mode. There are further conducted operations that retrial upper limit number is set to be two times and waiting time is set to 100 ms when the deterioration flag shows "not deteriorated", and retrial upper limit number is set to be ten times and waiting time is set to 200 ms when the deterioration flag shows "deteriorated" for example.

There have been described embodiments of the invention referring to the drawings, however, the specific structures of the invention are not limited to those shown in the disclosed embodiments, and modifications and additions within a range without departing from the spirit and scope of the invention are included in the invention.

It has been described in the processing in FIG. 2 in the first embodiment to acquire the SMART information when starting execution of the job and thereby to judge the state of deterioration. However, for example, it is also possible to construct to change various types of contents of control relating to execution of the job depending on contents of the deterioration flag in the case of job execution, by judging the deterioration by means of acquisition of the SMART information in prescribed timing such as power-on time, and by preserving the results of the judgment in the deterioration flag.

In addition, it has been described in the embodiment of the invention to conduct a changeover between an HDD use mode and an HDD non-use mode, a control of the retrial processing and monitoring of the vibration based on the SMART information. However, it is also possible to construct to change other controls relating to the execution of the job in accordance with the results of the judgment based on the SMART information. In a word, the change of control made in accordance with the state of deterioration of hard disk device 15 and with environmental conditions has only to secure the execution of a job. For example, it is also possible to employ the control to lower a possibility of occurrence of troubles by reducing an amount of data stored in hard disk device 15 by enhancing a compression rate of image data or lowering the resolution for reading when the hard disk device 15 is deteriorated.

Further, though an example of a vibration was described as an environmental condition in the embodiment, temperature and humidity may also be used for the control. For example, when an internal temperature of hard disk device 15 is higher or lower than an appropriate temperature range, an access speed of the hard disk device is sometimes lowered. Therefore, when the internal temperature is out of the appropriate temperature range, it is possible to employ the control to reduce the number of sheets per unit time for reading in scanner section 11 and for printing in printer section 12, compared with an occasion where the temperature is in an appropriate temperature range.

In the embodiment, an example of a digital multifunctional apparatus was described as a suitable example of the invention. However, an application of the invention is not limited to this, and the invention can be applied to other types of apparatuses, provided that the apparatus is an image processing apparatus employing the hard disk device.

In the image processing apparatus and the image processing system relating to the invention, the control relating to execution of the job on the occasion where a hard disk device is deteriorated is different from the control relating to execution of the job on the occasion where a hard disk device is not deteriorated, thus, when the hard disk device is deteriorated, the control according to the deterioration is used to secure the execution of the job.

What is claimed is:

1. An image processing apparatus comprising:
    a hard disk device which conducts reading or writing of image data during execution of a job, the job using the image data;
    an acquisition section which acquires information indicating a state of deterioration of the hard disk device; and
    a control section which executes the job, the control section being configured to perform operations comprising:
        setting a condition for a retrial treatment, the retrial treatment comprising trying to write the image data on a second sector of the hard disk device that is different from a first sector of the hard disk device that was previously used in an attempt to write the image data, the condition comprising at least one of: an upper limit to repeat retrial treatments, or a retrial interval for repeat retrial treatments;
        detecting a writing error during a writing of the image data on the hard disk device; and
        conducting the retrial treatment based on the set condition,
    wherein if the hard disk device is determined to have deteriorated more than a standard threshold, the control section:
        sets the upper limit to a number greater than a number that would be used for the upper limit if the hard disk device were determined not to have deteriorated more than the standard threshold, or
        sets the retrial interval to be longer than the retrial interval that would be used if the hard disk device were determined not to have deteriorated more than the standard threshold.

2. The image processing apparatus of claim 1 further comprising:
    a semiconductor memory,
    wherein the control section uses the semiconductor memory and the hard disk device for temporary storage of the image data for executing the job when the hard disk device is determined not to have deteriorated more than the standard threshold, and
    wherein the control section uses the semiconductor memory, but not the hard disk device, for temporary storage of the image data for executing the job when the hard disk device is determined to have deteriorated more than the standard threshold.

3. The image processing apparatus of claim 1,
    wherein the acquisition section further acquires information indicating an environmental condition of the hard disk device, and the control section changes the condition for the retrial treatment in accordance with the acquired environmental condition.

4. The image processing apparatus of claim 1, wherein the acquisition section acquires the information indicating the state of deterioration using a self-diagnosis function of the hard disk device.

5. An image processing system comprising an image processing apparatus communicatively coupled to a control server, wherein the image processing apparatus comprises:
    a hard disk device which conducts reading or writing of image data during execution of a job, the job using the image data;
    an acquisition section which acquires information indicating a state of deterioration of the hard disk device; and
    a control section which executes the job, the control section being configured to perform operations comprising:
        transmitting the information acquired by the acquisition section to the control server;
        receiving from the control server a determination of whether the hard disk device has deteriorated more than a predetermined standard threshold;
        setting a condition for a retrial treatment, the retrial treatment comprising writing the image data on a second sector of the hard disk device that is different from a first sector of the hard disk device that has been previously used in an attempt to write the image data, the condition comprising at least one of: an upper limit to repeat retrial treatments, or a retrial interval for repeat retrial treatments;
        detecting a writing error during writing of the image data on the hard disk device; and
        conducting the retrial treatment based on the condition for the retrial treatment,
    wherein if the hard disk device is determined to have deteriorated more than the standard threshold, the control section:
        sets the upper limit to a number greater than a number that would be used for the upper limit if the hard disk device were determined not to have deteriorated more than the standard threshold, or
        sets the retrial interval to be longer than the retrial interval that would be used if the hard disk device were determined not to have deteriorated more than the standard threshold.

6. The image processing system of claim 5, wherein the image processing apparatus further comprises:
    a semiconductor memory,
    wherein the control section uses the semiconductor memory and the hard disk device for temporary storage of the image data for executing the job when the determination indicates that the hard disk device has not deteriorated more than the standard threshold, and
    wherein the control section uses the semiconductor memory, but not the hard disk device, for temporary storage of the image data for executing the job when the determination indicates that the hard disk device has deteriorated more than the standard threshold.

7. The image processing system of claim 5, wherein the acquisition section acquires the information indicating the state of deterioration by a self-diagnosis function of the hard disk device.

* * * * *